(12) United States Patent
Foss et al.

(10) Patent No.: US 11,488,112 B2
(45) Date of Patent: Nov. 1, 2022

(54) SYSTEMS AND METHODS FOR PROVIDING MESSAGE TEMPLATES IN AN ENTERPRISE SYSTEM

(71) Applicant: ServiceNow, Inc., Santa Clara, CA (US)

(72) Inventors: Lucinda Foss, San Francisco, CA (US); Harshitha Kota Ram Gopal, Sunnyvale, CA (US); Kenneth James Hamer, Ramona, CA (US); Akhilesh Kondra, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/304,139

(22) Filed: Jun. 15, 2021

(65) Prior Publication Data

US 2021/0304147 A1 Sep. 30, 2021

Related U.S. Application Data

(63) Continuation of application No. 16/928,879, filed on Jul. 14, 2020, now Pat. No. 11,087,285, which is a continuation of application No. 15/726,112, filed on Oct. 5, 2017, now Pat. No. 10,740,726.

(51) Int. Cl.
| | |
|---|---|
| *G06F 17/10* | (2006.01) |
| *G06Q 10/10* | (2012.01) |
| *H04L 51/046* | (2022.01) |
| *H04L 51/063* | (2022.01) |
| *G06F 16/335* | (2019.01) |
| *G06F 40/186* | (2020.01) |

(52) U.S. Cl.
CPC ......... *G06Q 10/107* (2013.01); *G06F 16/335* (2019.01); *G06F 40/186* (2020.01); *H04L 51/046* (2013.01); *H04L 51/063* (2013.01)

(58) Field of Classification Search
CPC ... G06Q 10/107; G06F 16/335; G06F 40/186; H04L 51/046; H04L 51/063
See application file for complete search history.

(56) References Cited

U.S. PATENT DOCUMENTS

| | | | |
|---|---|---|---|
| 6,282,565 B1 | 8/2001 | Shaw et al. | |
| 6,304,886 B1 * | 10/2001 | Bernardo | G06F 40/166 707/E17.112 |
| 6,609,122 B1 | 8/2003 | Ensor | |
| 6,816,885 B1 | 11/2004 | Raghunandan | |
| 6,834,285 B1 * | 12/2004 | Boris | G06Q 10/10 |

(Continued)

*Primary Examiner* — Shahid K Khan
(74) *Attorney, Agent, or Firm* — Fletcher Yoder PC

(57) ABSTRACT

A system may include a number of records in a database associated with a number of activities to be performed by a first user. The system may also include a processor that may receive a request comprising information regarding a second user and an activity to be performed by the first user, identify a plurality of pre-defined message templates based on the request, and receive a selection of one of the plurality of pre-defined message templates. The processor may then generate message text incorporating the one of the plurality of pre-defined message templates for review and display via an electronic display, such that the message text is electronically stored in a dialogue window. The processor may display the message text in the dialogue in response to receiving an approval of the message.

20 Claims, 8 Drawing Sheets

(56) References Cited

U.S. PATENT DOCUMENTS

| Patent No. | Date | Inventor | CPC |
|---|---|---|---|
| 7,007,066 B1 | 2/2006 | Malik | |
| 7,020,706 B2 | 3/2006 | Cates | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,444,374 B1 | 10/2008 | Baker | |
| 7,610,512 B2 | 10/2009 | Gerber | |
| 7,617,073 B2 | 11/2009 | Trinon | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,209 B2 | 2/2011 | Gerber | |
| 7,925,981 B2 | 4/2011 | Pourheidari | |
| 7,930,396 B2 | 4/2011 | Trinon | |
| 7,936,863 B2 | 5/2011 | John et al. | |
| 7,945,860 B2 | 5/2011 | Vambenepe | |
| 7,966,398 B2 | 6/2011 | Wiles | |
| 8,005,900 B2 | 8/2011 | Lueckhoff | |
| 8,051,164 B2 | 11/2011 | Peuter | |
| 8,224,683 B2 | 7/2012 | Manos | |
| 8,261,197 B2 | 9/2012 | Lemay et al. | |
| 8,266,096 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 8,949,275 B1 | 2/2015 | Aasuri-Maringanti | |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,317,327 B2 | 4/2016 | Apte | |
| 9,363,252 B2 | 6/2016 | Mueller | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 10,361,981 B2 * | 7/2019 | Bennett | H04L 51/04 |
| 2002/0059325 A1 * | 5/2002 | Beizer | G06F 16/2308 707/999.203 |
| 2002/0178229 A1 | 11/2002 | Sinha et al. | |
| 2004/0249786 A1 | 12/2004 | Dabney et al. | |
| 2005/0066005 A1 | 3/2005 | Paul | |
| 2005/0229150 A1 | 10/2005 | Ronnewinkel | |
| 2006/0064313 A1 * | 3/2006 | Steinbarth | G06Q 10/1057 705/322 |
| 2006/0212855 A1 * | 9/2006 | Bournas | G06Q 10/00 717/140 |
| 2007/0100947 A1 * | 5/2007 | Chen | G06Q 10/107 709/206 |
| 2007/0220505 A1 * | 9/2007 | Bukovec | G06F 8/60 717/173 |
| 2007/0282659 A1 * | 12/2007 | Bailey | G06Q 10/06 705/7.11 |
| 2008/0109735 A1 | 5/2008 | Vuong | |
| 2008/0178073 A1 * | 7/2008 | Gao | G06F 40/103 715/752 |
| 2008/0244594 A1 * | 10/2008 | Chen | G06F 8/34 718/104 |
| 2009/0234699 A1 * | 9/2009 | Steinglass | G06Q 10/06313 705/7.23 |
| 2011/0078426 A1 * | 3/2011 | Stoitsev | G06Q 10/04 718/107 |
| 2011/0087510 A1 * | 4/2011 | Putra | G06Q 10/063112 709/204 |
| 2012/0054289 A1 * | 3/2012 | Aytulu | G06Q 10/107 709/206 |
| 2012/0117176 A1 * | 5/2012 | Luo | H04W 4/14 709/206 |
| 2012/0170571 A1 * | 7/2012 | Antonelli | H04L 69/04 370/352 |
| 2012/0272143 A1 | 10/2012 | Gillick | |
| 2013/0311997 A1 * | 11/2013 | Gruber | H04W 4/00 718/102 |
| 2014/0006972 A1 | 1/2014 | Celkonas | |
| 2014/0282243 A1 | 9/2014 | Eye et al. | |
| 2014/0317502 A1 * | 10/2014 | Brown | G06Q 10/02 715/706 |
| 2014/0365263 A1 * | 12/2014 | Honeyman | G06F 3/04817 705/7.25 |
| 2015/0052083 A1 | 2/2015 | Zhou et al. | |
| 2015/0121216 A1 * | 4/2015 | Brown | G06N 3/008 715/705 |
| 2015/0142704 A1 * | 5/2015 | London | G06Q 10/10 706/11 |
| 2015/0195179 A1 * | 7/2015 | Skare | G06F 3/0482 715/779 |
| 2016/0234139 A1 | 8/2016 | Botner | |
| 2016/0247246 A1 * | 8/2016 | Bluestone | G06Q 50/265 |
| 2016/0294759 A1 | 10/2016 | Huang et al. | |
| 2016/0378549 A1 | 12/2016 | Irish | |
| 2017/0001308 A1 * | 1/2017 | Bataller | G06F 3/0484 |
| 2017/0132199 A1 * | 5/2017 | Vescovi | G06Q 10/06311 |

* cited by examiner

⮜ ≡ HR TOTAL REWARDS CASE
HRC0001061  ⌀ ⋀ ≣ ⋯  FOLLOW ▾  UPDATE  START WORK  CANCEL  DELETE  TEMPLATE  ⮍

*ADDITIONAL COMMENTS (CUSTOMER VISIBLE)

ADDITIONAL COMMENTS (CUSTOMER VISIBLE)

POST

ACTIVITY (RS) ROGER SEID     2017-08-16 11:32:50

HI ADAM BROWN

WE RECEIVED YOU ATTACHMENTS. PLEASE REVIEW THE RECEIPTS AGAIN AND ENSURE YOU HAVE THE FOLLOWING DOCUMENTS ATTACHED:

RECEIPTS TOTALLING $5,000.00
TRANSCRIPTS SHOULD REFLECT THE FOLLOWING INFORMATION
COURSE TITLE: DATA SCIENCE
COURSE START DATE: 2017-08-07
COURSE END DATE: 2017-08-11

PLEASE REVIEW AND RESUBMIT THE RECEIPTS
THANK YOU,
ROGER SEID

↙ 316

WORK NOTES (RS) ROGER SEID

HI ADAM BROWN
WE RECEIVED YOU ATTACHMENTS. PLEASE REVIEW THE RECEIPTS AGAIN AND ENSURE YOU

FIG. 8

SYSTEMS AND METHODS FOR PROVIDING MESSAGE TEMPLATES IN AN ENTERPRISE SYSTEM

CROSS-REFERENCE TO RELATED APPLICATIONS

This application is a continuation application of U.S. patent application Ser. No. 16/928,879, filed Jul. 14, 2020, which is a continuation application of U.S. patent application Ser. No. 15/726,112, filed Oct. 5, 2017, the entire contents of which are hereby incorporated by reference in their entirety for all purposes.

TECHNICAL FIELD

The present disclosure relates in general to systems, methods, and apparatuses for providing message templates for individuals to use when performing various tasks for an enterprise. More specifically, the present disclosure is related to systems and methods for identifying and providing message templates that may assist a user in performing certain activities related to other parties of an enterprise.

BACKGROUND

This section is intended to introduce the reader to various aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In an enterprise or organization, certain requests by members (e.g., requesting members) of an enterprise may be created within an enterprise system that tracks the progress of activities associated with the requests. That is, the requests may detail one or more specific operations to be performed by other fulfiller members in the enterprise. Over time, as the requested activities are completed or different issues arise related to the completion of the requested operations, it may be useful to ensure that the member provides feedback regarding the completion of the operation or the issues related to the operation in a consistent manner. Moreover, if certain actions or responses are regularly undertaken by a member, it may be useful to provide the member with a system that manages the feedback options available to the member based on the common trends and issues that regularly occur when performing the same activities.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As discussed above, different members of an enterprise (referred to as fulfillers herein) may be tasked with performing different operations based on a particular request by a requesting member (referred to as a requestor herein) of the enterprise. For example, an information technology (IT) department of an enterprise may be tasked (e.g., assigned activity) with assigning a newly hired employee with a computer, a facilities department may be tasked with assigning the newly hired employee a badge to grant access to certain buildings, a human resources department may be tasked with collecting certain information from the newly hired employee and the like. In certain embodiments, to assist in the assignment and distribution of activities across an enterprise, a server system may receive data indicative of a requested operation associated with a member of the enterprise. Based on the received data regarding the requested operation, the server system may determine one or more pre-defined templates that each provides a respective set of information to be recorded in the server system by a fulfiller. The pre-defined templates may include data that may populate different data fields associated with the requested operation, message text to be transmitted to the requestor, and the like. By saving and providing the pre-defined templates within the server system, each fulfiller may provide a consistent message to its other members. Moreover, the user of pre-defined templates may reduce the amount of time each fulfiller uses in collecting relevant data or drafting a message in instances where the response to the requested operations occur regularly. Additional details with regard to providing template data for certain requested operations will be discussed in more detail below with reference to FIGS. 1-9.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

FIG. 5 is an example graphical user interface related to an activity assigned to a member of an enterprise using the example server system of FIG. 3, in accordance with an embodiment;

FIG. 6 is an example graphical user interface of message template options related to an activity assigned to a member of an enterprise using the example server system of FIG. 3, in accordance with an embodiment;

FIG. 7 is an example graphical user interface with a populated message related to an activity assigned to a member of an enterprise using the example server system of FIG. 3, in accordance with an embodiment;

FIG. 8 is an example graphical user interface of a message log stored in the example server system of FIG. 3, in accordance with an embodiment.

DETAILED DESCRIPTION

Figure 1:
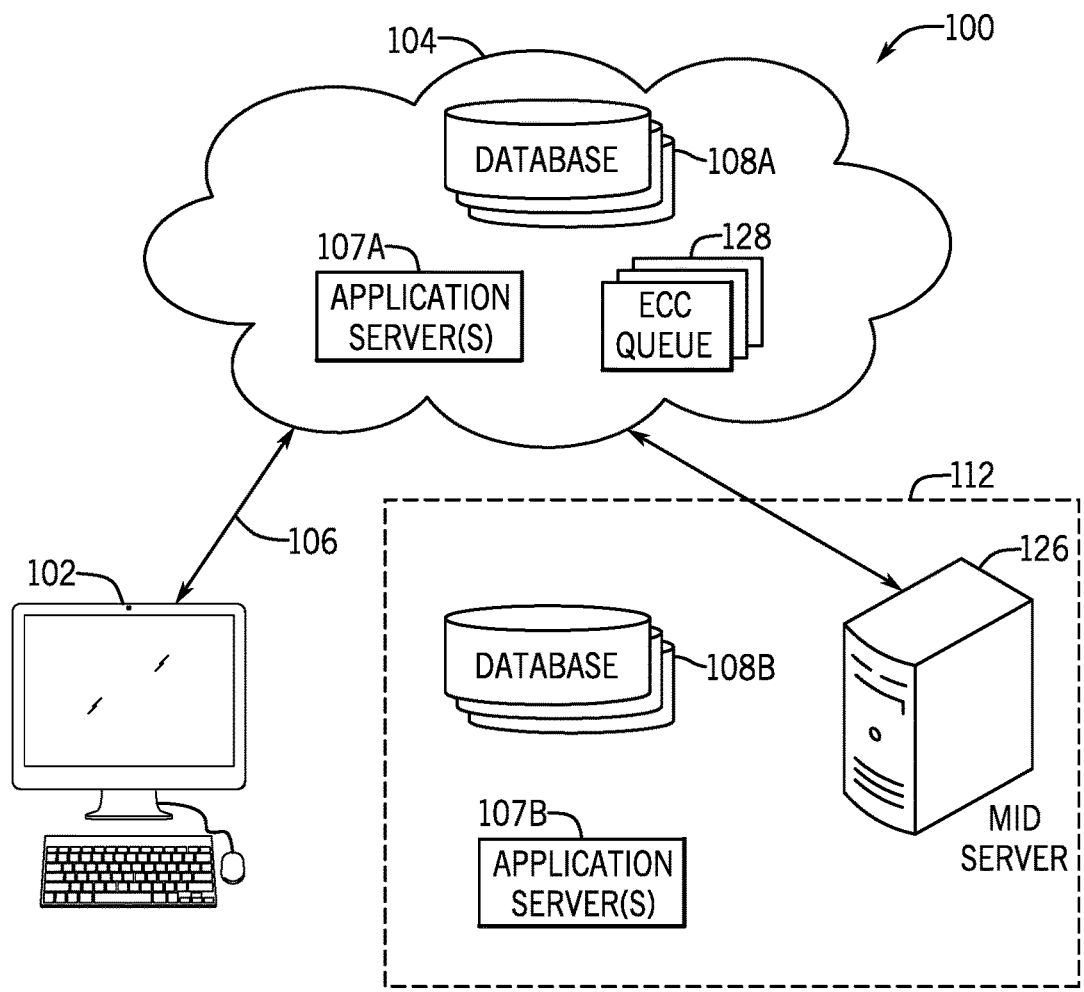
FIG. 1 is a block diagram of a generalized distributed computing system utilizing a cloud service, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in an increasingly electronics-driven world in which various electronics devices are interconnected within a distributed context. As more functions are performed by services using some form of distributed computing, the ability of IT devices to coordinate activities for different members across an enterprise increases. For example, as new tasks and activities are assigned to different members of an enterprise, a server system may coordinate the transmittal of the requested activity to a portal or address associated with a fulfiller assigned to perform the requested activity. In addition, the server system may track the progress of the fulfiller in completing the task and may also provide the fulfiller with certain features to assist the fulfiller to perform his activities more efficiently.

By way of example, after receiving an indication that the fulfiller is to perform a certain activity, the server system may determine whether a set of expected responses or a set of expected datasets related to the activity are stored in a memory or database. That is, over time, certain activities performed by a group of members may involve a limited number of actions when performing the activity. After the limited number of actions are identified and stored in a memory component, the server system may provide these limited number of actions as selectable options for the fulfiller to perform. In one specific example, an information technology (IT) member of an enterprise may receive a request to provide a new employee with a new computer. After receiving the request, the server system may determine that a set of pre-defined messages may be transmitted to the requestor based on the request. For instance, the request may be lacking information with respect to a type of computer that the requestor is seeking or the request may include the relevant information that the fulfiller uses to perform the associated tasks. Based on these two scenarios, the server system may display two selectable options for the fulfiller to send to the requestor: 1) a request for additional information with regard to the type of computer needed; or 2) the request is received and is currently being processed.

With the above example in mind, it may become clear that when numerous fulfillers continuously receive requests for the same or similar activities, each individual fulfiller may provide a different variation of the responses provided above. That is, each fulfiller may use his own words to provide a response. To provide a more consistent response message for various requests, the server system may provide the fulfiller a list of expected responses based on the requested activity. In this way, the fulfiller may avoid attempting to create new inconsistent responses and may improve the efficiency in which he performs his activity by automatically populating his response message after he selects his preferred option. Additional details with regard to the embodiments described herein will be discussed below with reference to FIGS. 1-9.

By way of introduction FIG. 1 is a block diagram of a system 100 that utilizes a distributed computing framework, which may perform one or more of the techniques described herein. As illustrated in FIG. 1, a client 102 communicates with a cloud service 104 over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The cloud service 104 may include any suitable number of computing devices (e.g., computers) in one or more locations that are connected together using one or more networks. For instance, the cloud service 104 may include various computers acting as servers in datacenters at one or more geographic locations where the computers communicate using network and/or Internet connections. The communication channel 106 may include any suitable communication mechanism for electronic communication between the client 102 and the cloud service 104. The communication channel 106 may incorporate local area networks (LANs), wide area networks (WANs), virtual private networks (VPNs), cellular networks (e.g., long term evolution networks), and/or other network types for transferring data between the client 102 and the cloud service 104. For example, the communication channel 106 may include an Internet connection when the client 102 is not on a local network common with the cloud service 104. Additionally or alternatively, the communication channel 106 may include network connection sections when the client and the cloud service 104 are on different networks or entirely using network connections when the client 102 and the cloud service 104 share a common network. Although only a single client 102 is shown connected to the cloud service 104, it should be noted that cloud service 104 may connect to multiple clients (e.g., tens, hundreds, or thousands of clients).

Through the cloud service 104, the client 102 may connect to various devices with various functionality, such as gateways, routers, load balancers, databases, application servers running application programs on one or more nodes, or other devices that may be accessed via the cloud service 104. For example, the client 102 may connect to an application server 107A and/or one or more databases 108A via the cloud service 104. The application server 107A may include any computing system, such as a desktop computer, laptop computer, server computer, and/or any other computing device capable of providing functionality from an application program to the client 102. The application server 107A may include one or more application nodes running application programs whose functionality is provided to the client via the cloud service 104. The application nodes may be implemented using processing threads, virtual machine instantiations, or other computing features of the application server 107A. Moreover, the application nodes may store, evaluate, or retrieve data from the databases 108A and/or a database server.

The databases 108A may contain a series of tables or records containing information about assets and services controlled by a client 102 and the configurations of these assets and services. The assets and services include may include hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models).

In some embodiments, the databases 108A, whether in the cloud or at a client site accessible via the cloud or other network interconnection, may include information related to activity sets for certain personnel to perform. The databases 108A may each be associated with one or more departments of an enterprise. That is, an enterprise or organization may include a number of different departments that perform different operations for the overall enterprise. For instance, an IT department may assist in connecting information technology (IT) devices, software or applications, or virtualized environments for a member (e.g., employee) of the enterprise, human resources department may assist in hiring the member, and a facilities department may assist in providing access to various building associated with the member.

In addition to the databases 108A, the cloud service 104 may include one or more other database servers. The database servers are configured to store, manage, or otherwise provide data for delivering services to the client 102 over the communication channel 106. The database server may include one or more additional databases that are accessible by the application server 107A, the client 102, and/or other devices external to the additional databases. By way of example, the additional databases may include information related to member or assets of the enterprise. In some embodiments, the information regarding each member may be organized or stored a respective database of the databases 108A based on a department in which the member is assigned to. The information may include data regarding the member such as skill set, education background, role, job function, assigned activities or tasks, location, demographic information, and the like.

In the depicted topology, access to non-cloud resources, such as database 108B and/or application server 107B, from the cloud service 104 is enabled via a management, instrumentation, and discovery (MID) server 126 via an External Communications Channel (ECC) Queue 128. The MID server 126 may include an application program (e.g., Java application) that runs as a service (e.g, Windows service or UNIX daemon) that facilitates communication and movement of data between the cloud service 104 and external applications, data sources, and/or services. The MID server 126 may be executed using a computing device (e.g., server or computer) on the network 112 that communicates with the cloud service 104.

The ECC queue 128 may be a database table that is typically queried, updated, and inserted into by other systems. Each record in the ECC queue 128 is a message from an instance in the cloud service 104 to a system (e.g., MID server 126) external to the cloud service 104 that connects to the cloud service 104 or a specific instance running in the cloud service 104 or a message to the instance from the external system. The fields of an ECC queue 128 record include various data about the external system or the message in the record.

Although the system 100 is described as having the application servers 107A, the databases 108A, the ECC queue 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems may communicate with the cloud service 104 in addition to the MID server 126.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the cloud service 104.

In addition, methods for populating the databases 108A may include directly importing data or entries from an external source, manual import by users entering or updating data entries via a user interface, and the like. Moreover, it should be understood that the embodiments described herein should not be limited to being performed with respect to a particular database or type of stored data. Instead, the present systems and techniques described herein may be implemented with any suitable database.

Figure 2:
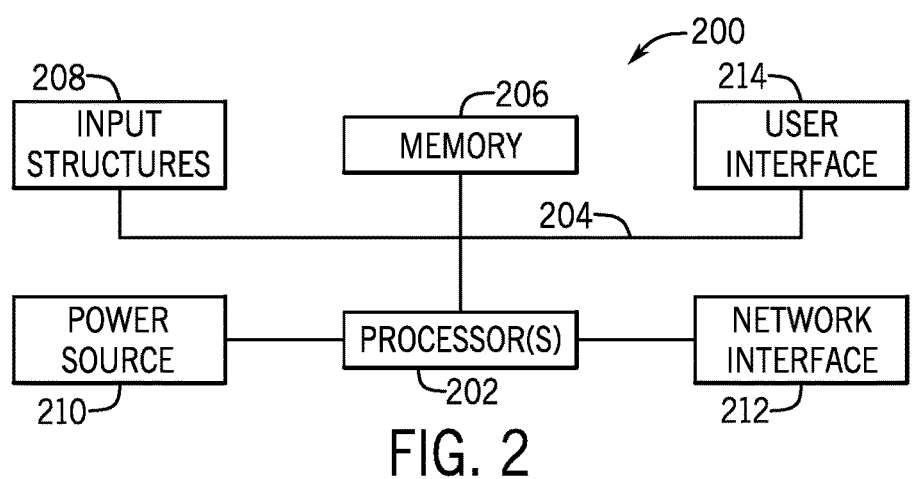
FIG. 2 is a block diagram of a computing device utilized in the distributed computing system of FIG. 1, in accordance with an embodiment.

In any case, to perform one or more of the operations described herein, the client 102, the application server 107A, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107A, a database server (e.g., databases 108A), other servers or processor-based hardware devices present in the cloud service 104 (e.g., server hosting the ECC queue 128) or at a local or remote client site, a device running the MID server 126, and so forth. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processor capable of performing instructions stored in the memory 206. For example, the one or more processors may include microprocessors, system on a chips (SoCs), or any other performing functions by executing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics-processing unit (GPU).

The one or more busses 204 include suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols.

A user interface 214 may include a display that is configured to display images transferred to it from the one or more processors 202. In addition and/or alternative to the display, the user interface 214 may include other devices for interfacing with a user. For example, the user interface 214 may include lights (e.g., LEDs), speakers, and the like.

Figure 3:
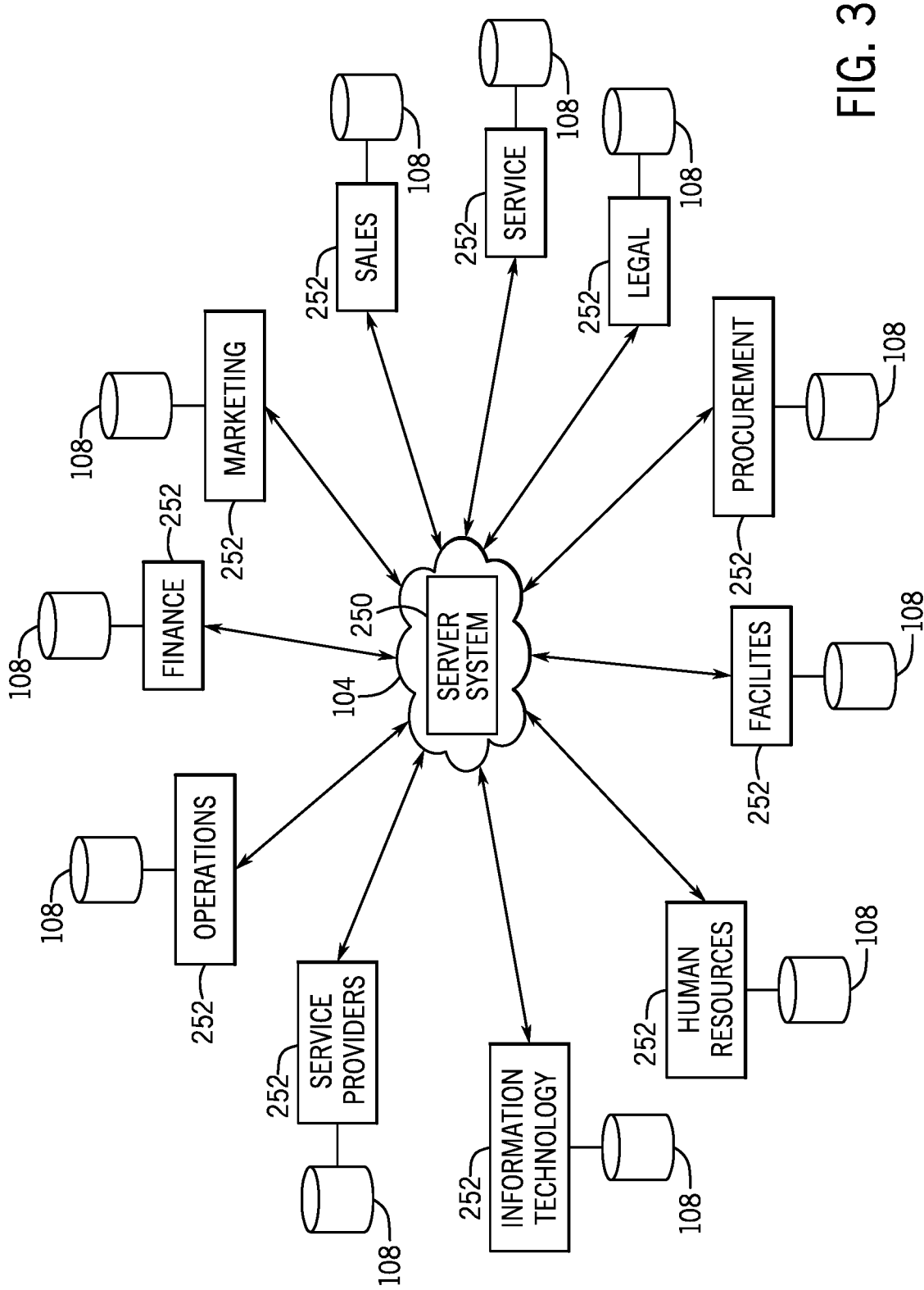
FIG. 3 is a block diagram of an example server system that may be part of the distributed computing system of FIG. 1, in accordance with an embodiment.

With the foregoing in mind, FIG. 3 illustrates a block diagram of an example server system 250 that may be communicatively coupled to different department server systems via the cloud service 104. As mentioned above, an enterprise or organization may be made up of a number of different departments. In one embodiment, server system 250 may be a computing device 200 or the like accessible to the cloud service 104. The server system 250 may access different databases 108 associated with different departments. Each database 108 associated with a respective department may communicate with the server system 250 via the cloud service 104 and a respective server system associated with the respective database. For example, FIG. 3 illustrates a number of server systems that may facilitate communication to, query requests, and the like with a respective database 108.

By way of example, the department server systems 252 may be associated with departments such as an operations department, a finance department, a marketing department, a sales department, a service department, a legal department, a procurement department, a facilities department, a human resources department, an information technology department, a service providers department, and the like. Generally, a database 108 associated with each department may include data related to the members of the enterprise that are also part of the respective department, tasks or activities to be performed by the department, calendar information related to the events scheduled for the respective department, and the like. In one embodiment, the data related to the members of the department may include a working schedule of the member, a list of skills of the member, a list of job functions performed by the member, and the like. The activities stored in a respective database associated with a respective department may include a list of tasks to be performed by a member of the respective department in response to a certain event (e.g., lifecycle event) and an association to an activity set related to the event. The event may be related to a change in a status of a member of the enterprise. For instance, the event may be related to employee on-boarding, employee off-boarding, employee location change, employee organization change, employee promotion, and the like.

Employee on-boarding may include instances when a new member (e.g., employee) joins the enterprise. Conversely, employee off-boarding may include when a member terminates his association with the enterprise. Employee location change may refer to when a member moves locations within the enterprise. The location change may include a change in office space with respect to one office building or with respect to a different geographical location (e.g., city, state, country). Employee organization change may include changing the department in which the member is associated with. In addition, employee promotion may include instances when a job title of a member changes, and thus responsibilities or job functions of the member changes.

Referring briefly back to FIG. 3, each of the illustrated departments may perform different functions that contribute to the operation of the enterprise as a whole. For example, the finance department may be tasked with generating financial reports and financial forecasts for the enterprise. The marketing department may be tasked with generating marketing documents and strategies for the enterprise, products produces by the enterprise, and the like. The sales department may be tasked with coordinating sales effort to engage new business relationships for the enterprise. The service department may coordinate with existing clients of the enterprise to maintain products and services previously sold to the clients. The legal department may be tasked with ensuring that the enterprise conforms to the laws of the jurisdictions in which the enterprise operates. The procurement department may manage the distribution of supplies, products, and services to and from the enterprise. The facilities department may control access to different building owned and operated by the enterprise. The facilities department may also control the environmental conditions of each building and the maintenance operations for maintaining building structure and operations. In addition, the human resources department may manage the employment services provided to a member of the enterprise. For example, the human resources department may collect information regarding a new hire, coordinate benefits services provided to the new hire, and the like. The information technology (IT) department may manage the devices (e.g., printer, databases, server systems, computing devices) used by the member for the enterprise. The service providers department may coordinate with vendors and other organization that provide services to the enterprise. It should be noted that the foregoing list of departments should not be construed as an exclusive list of departments or a defined list of operations performed by the department; instead, the description of the departments are provided as examples and may include additional departments and additional operations and tasks for the described departments.

Given the number of different departments associated with a single enterprise and the number of different members who work within the single enterprise, it may prove to be difficult to perform activities in a consistent and uniform manner across the enterprise. For example, during an employee on-boarding event, a number of departments may have activities or tasks to perform to enable the new hire to perform his/her job functions more quickly and efficiently. Keeping this example in mind, before the new hire starts, the IT department may identify a computing device for the new member to use, add the new member to a database for access to the server system 250 or other computing resources, issue network user name for the new member, and the like. In the same manner, the HR department may prepare documents for the new member to review and sign upon starting his/her employment. The facilities department assign a workspace to the individual and may prepare a badge or other identification material for the new member to gain access to certain buildings based on the department that the new member will be joining, the job functions of the new member, and the like.

As shown in the example above, different departments may have different activities or tasks that are to be performed based on a given event associated with a member of the enterprise. While performing their respective tasks, certain common or expected messages may be transmitted to a member requesting an activity, to a member associated with an activity, or the like. That is, to perform certain activities, the fulfiller or the member performing the activity may have certain protocols to follow, information to gather, operations to perform, or the like prior to completing a respective activity. When following a certain protocol, a number of pre-defined message or response templates may be stored in the database 108 to assist the fulfiller in obtaining information or data to complete his respective activity. In one embodiment, the pre-defined message templates may be provided by members to the server system 250 over time. In other embodiments, the server system 250 may monitor the response messages created and transmitted to a requestor or a member associated with an activity to identify common messages, messages that are employed more than a threshold amount of time, messages used by more than a percent threshold amount of fulfillers, or the like. Based on this observation, the server system 250 may store one or more common messages that are consistently used by members when responding to activity requests with similar data entries or lack of certain data entries in the database 108 as pre-defined message templates. After the pre-defined message templates are stored, the server system 250 may monitor the received activity requests to determine whether a set of data entries is received or a set of data entries is missing. Based on the monitored activity request, the server system 250 may generate a visualization of selectable options of pre-defined message templates for the fulfiller to select. After receiving the selection, the server system 250 may populate a message window with message text associated with the selected pre-defined message template. The server system 250 may receive modifications to the message text and may then transmit the resulting message to the appropriate member that may have access to the desired data entries.

Figure 4:
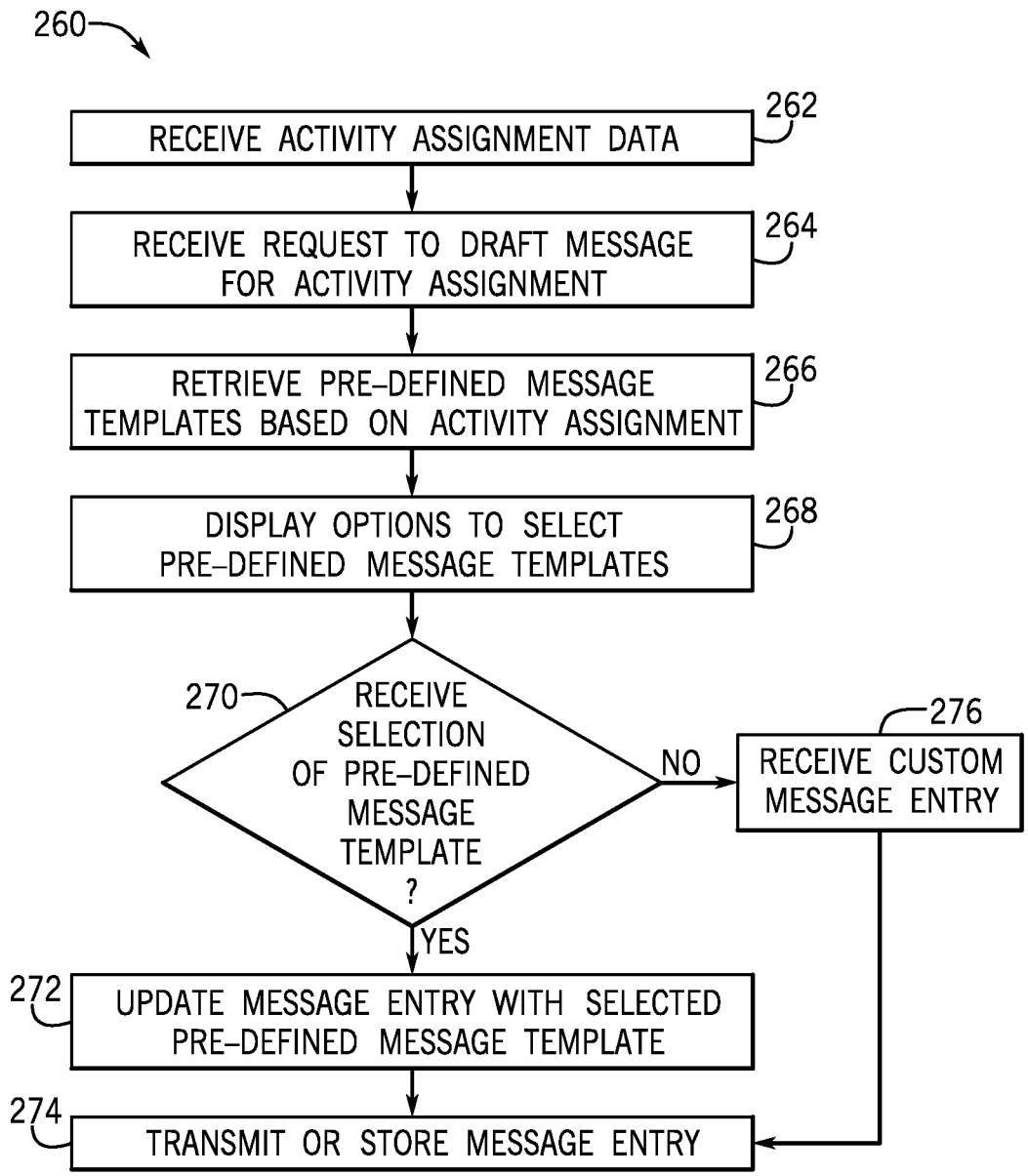
FIG. 4 is a flow chart of a method for retrieving data related to activities associated with members of an enterprise using the example server system of FIG. 3, in accordance with an embodiment.

To further illustrate how the server system 250 may provide the fulfiller with selectable pre-defined message templates, FIG. 4 illustrates a flow chart of a method 260 for retrieving data related to activities to be performed by a fulfiller. Although the following description of the method 260 is detailed in a particular order, it should be noted that the method 260 may be performed in any suitable order. Moreover, although the method 260 is described as being performed by the server system 250, it should be understood that the method 260 may be performed by any suitable computing device, as described above.

In addition, for the purposes of discussion, the following description of the method 260 will be detailed with reference to an example activity for processing a tuition reimbursement request. Although the tuition reimbursement request is provided as an example here, it should be understood that the embodiments described herein are not limited to the particular example or to a particular department. Instead, it should be understood that the method 260 may be performed for any suitable activity in a variety of departments.

Referring now to FIG. 4, at block 262, the server system 250 may receive an indication or detect that an activity assignment for a fulfiller of the enterprise has been received. The activity assignment may refer to an operation, task, approval, or other function that the fulfiller is to perform, such that the activity assignment is completed. In certain embodiments, the server system 250 may receive the activity assignment via the client 102, the cloud service 104, or the like. That is, a member of the enterprise requesting the activity may submit a request via the client 102, which may then forward the request to the server system 250.

Figure 5:
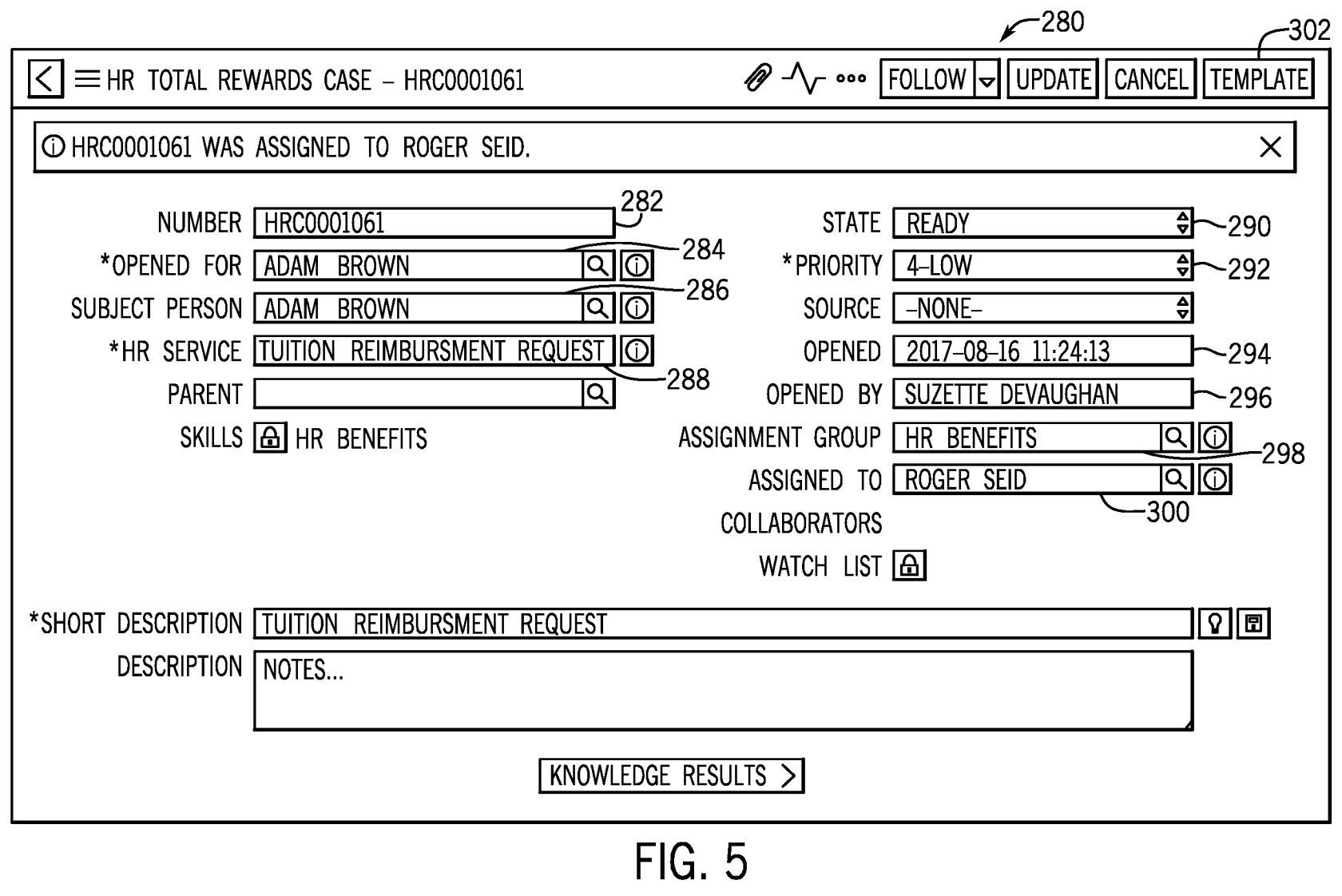

The activity assignment may include data related to the requested activity. The data may include information for different data entry fields (e.g., reference number, member names, requested service) related to the requested activity. By way of example, FIG. 5 illustrates a graphical user interface (GUI) 280 that depicts example data entry fields for a requested human resources activity. The GUI 280 of FIG. 5 is populated with data related to a tuition reimbursement request. The data entry fields of the GUI 280 may be provided by the server system 250, such that a member may enter information into the data entry fields, view the information provided in the data entry fields, or the like. The data entry fields of the GUI 280 may include a reference number field 282, a target member field 284, a subject member field 286, a service type field 288, a status field 290, a priority field 292, an initialization time field 294, a requestor field 296, an assignment group field 298, a fulfiller field 300, and the like. In certain embodiments, the information provided in each of the data fields of the GUI 280 may be entered by the requestor, may be automatically populated by the server system 250 based on received input at one or more of the data fields, or the like. Although the GUI 280 illustrates a number of types of data entry fields, it should be noted that each different type of activity may be associated with a different set of data entry fields that provides information related to performing the respective type of activity.

After the activity assignment data, at block 264, the server system 250 may receive a request to draft a message for a member associated with the assigned activity. As shown in FIG. 5, the request may be received via an input component 302 of the GUI 280. In certain embodiments, each type of assigned activity may involve certain operations or procedures to be undertaken by the fulfiller. In the tuition reimbursement example, the fulfiller may review the receipts provided by the requestor to verify that the receipts match the information in the appropriate data entry fields. When performing a respective activity, fulfillers may often find that they prepare the same types of messages for a particular activity. Referring to the tuition reimbursement example again, when approving the reimbursement, the fulfiller may find that three types of messages are commonly used to complete the requested activity. Instead of preparing the same response for a number of different activities, the server system 250 may store pre-defined message or response templates that mirror the commonly used messages.

After receiving the request to draft a message for the assigned activity, at block 266, the server system 250 may retrieve one or more pre-defined message templates based on the assigned activity, the information provided in the data entry fields associated with the assigned activity, and the like. In certain embodiments, the pre-defined message templates may be stored in the database 108 or another suitable storage device. Other members of the enterprise may provide the pre-defined message templates during the design of the activity or the like.

The server system 250 may retrieve the pre-defined message templates based on the type of activity being performed, based on data provided in the data entry fields associated with the activity, based on data missing in the data entry fields, and the like. For instance, if the fulfiller field 300 lists a particular member, the server system 250 may determine whether certain pre-defined message templates are associated with particular member and the assigned activity. If the server system 250 identifies a set of pre-defined message templates, the server system 250 may retrieve the set of pre-defined message templates from the storage device.

In addition, the server system 250 may review the information provided in the data entry fields of an assigned activity and determine whether certain information is missing. If information is missing in a data entry field, the server system 250 may determine whether one or more pre-defined message templates stored in the database 108 or the like are associated with a scenario in which the respective data entry field is missing.

Figure 6:
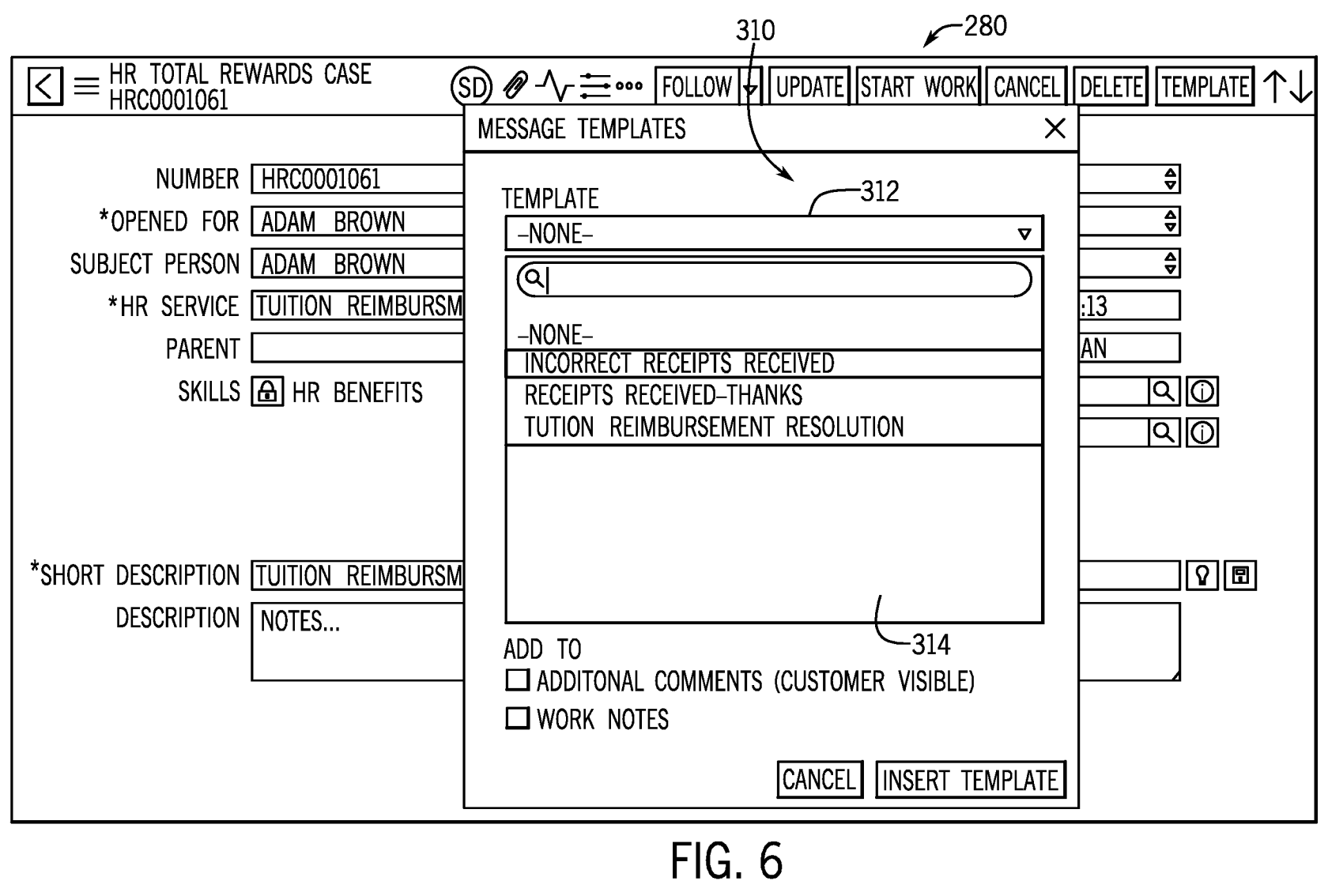

After retrieving the pre-defined message templates, at block 268, the server system 250 may display one or more selectable options for the one or more pre-defined message templates. For example, FIG. 6 illustrates a message template window 310 depicted on the GUI 280. The message template window 310 may include a drop-down menu 312 that illustrates provides selectable options for the fulfiller to choose when preparing a message to the requestor (or other member) associated with the activity. Referring again to the tuition reimbursement example, the server system 250 may provide selectable options to generate a pre-defined message for when incorrect receipts are received, when accurate receipts are received, or when a resolution with regard to the reimbursement is determined. As discussed above, the server system 250 may retrieve these three selectable options based on detecting that the activity was related to tuition reimbursement. Moreover, the selectable options may be provided to the server system 250 at some earlier time via user input or via supervised or unsupervised analysis of the generated messages by the server system 250.

Figure 7:
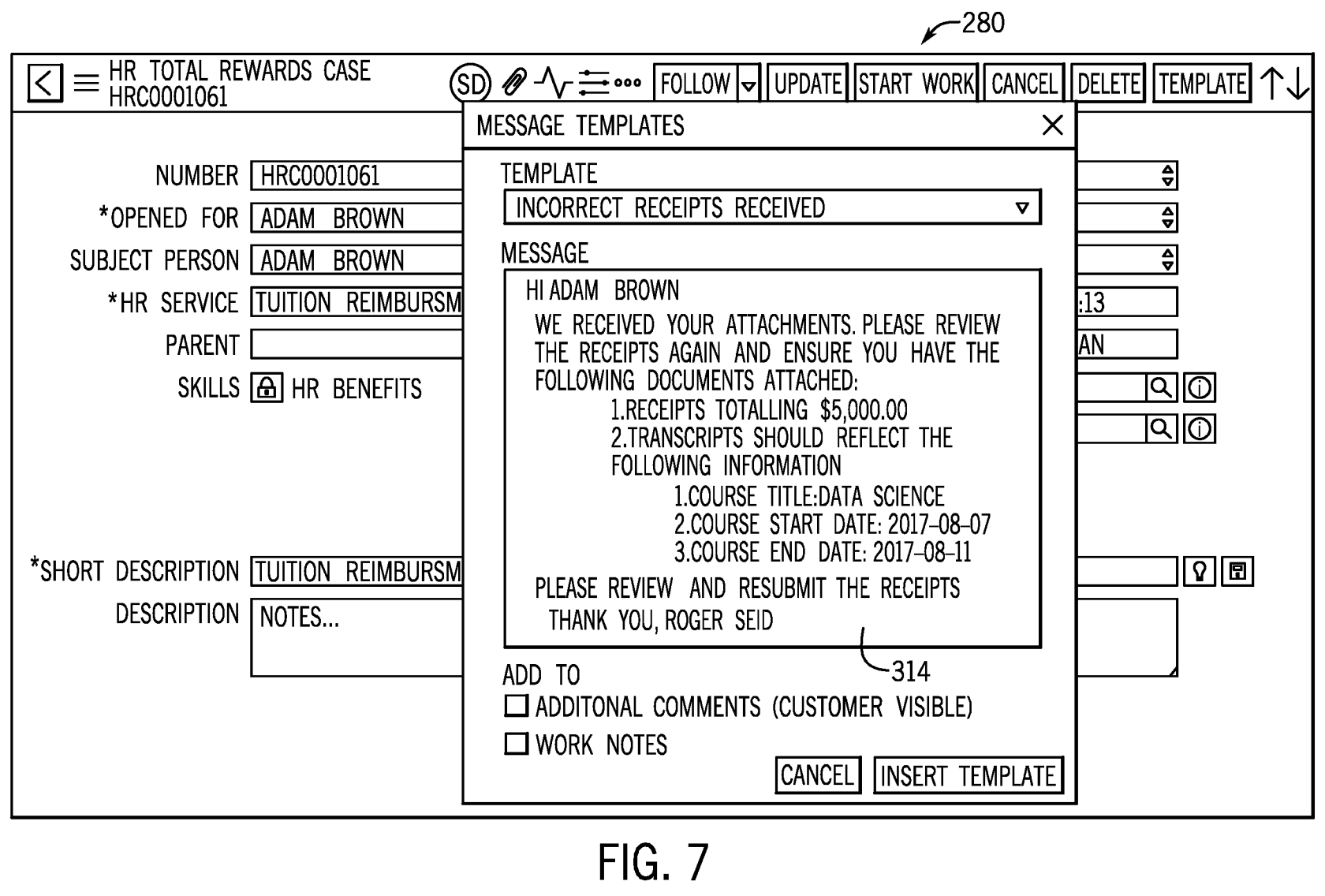

At block 270, the server system 250 may receive a selection of one of the selectable options, which correspond to one of the pre-defined message templates. After receiving the selection, at block 272, the server system 250 may update or populate a message text window 314 with the pre-defined message template that corresponds to the selected option. With the tuition reimbursement example in mind, FIG. 7 illustrates text populated in the message text window 314 that corresponds to the selected pre-defined message template.

In certain embodiments, the server system 250 may monitor and track the pre-defined template selected by different users over time. The server system 250 may track the raw number of times that each pre-defined template was selected. The server system 250 may also track additional information associated with the selection of each pre-defined template. For example, the server system 250 may track the entries of various data entry fields along with the selected pre-defined template. In one embodiment, when presenting the selectable options of the pre-defined templates in the drop-down menu 312 or the like, the server system 250 may present the selectable options in a particular order. That is, the server system 250 may automatically determine a ranking of each of the selectable options based on a number of times other users selected each selectable option, based on the number of times other users with similar data entry fields selected each selectable option, or the like. In this way, the server system 250 may present the selectable options that may be selected more often by other users or selected more often by other users with similar data entry fields at the top of the drop-down menu 312 according to the determined rank. As a result, the fulfiller may more quickly identify the selectable option that he wishes to choose without scrolling through the entire list of selectable options.

In some embodiments, the pre-defined message template may include certain programming objects to populate portions of the message text based on the activity data. For example, the salutation field may include a programmable object that inserts the name of the receiving member in the salutation address. In addition, a programming object may be employed in the signature block to include the name of the fulfiller. It should be noted that prior to transmitting or storing the message text, the server system 250 may receive modification or additions to the message text to provide additional information for the recipient.

After the message text is populated in the message text window 314, the server system 250 may, at block 274, transmit the message to a network address associated with the appropriate recipient in response to receiving an indication of approval of the message via an input component or the like. In certain embodiments, the server system 250 may store the message in a dialogue window 316, as depicted in FIG. 8. The dialogue window 316 may be viewable on the recipient's portal or GUI 280 accessible to the recipient via the client 102. The dialogue window 316 may record the messages transmitted between parties related to a particular activity.

Referring back to block 270, if the server system 250 does not receive a selection of the pre-defined message templates, the server system 250 may proceed to block 276 and receive a custom message entry. That is, the server system 250 may receive text input in the message text window 314 for transmittal or storage for the recipient. After receiving the customized or user input text, the server system 250 may proceed to block 274 and transmit or store the custom text message, as described above, in response to receiving an approval of the text via a user input component.

By providing the ability to select pre-defined message templates, the present embodiments enable fulfiller to consistently respond to certain scenarios for completing activities in a consistent manner. The consistent responses from various fulfillers assist the enterprise to operate cohesively without changing response messages or procedures for different requestors. This enhances the effectiveness of the fulfillers in performing its activity. Moreover, by providing pre-defined message templates that correspond to common messages used to complete various tasks efficiently. In addition to receiving pre-defined message templates via user input, in some embodiments, the server system 250 may determine pre-defined message templates through supervised or unsupervised monitoring and analysis.

Figure 9:
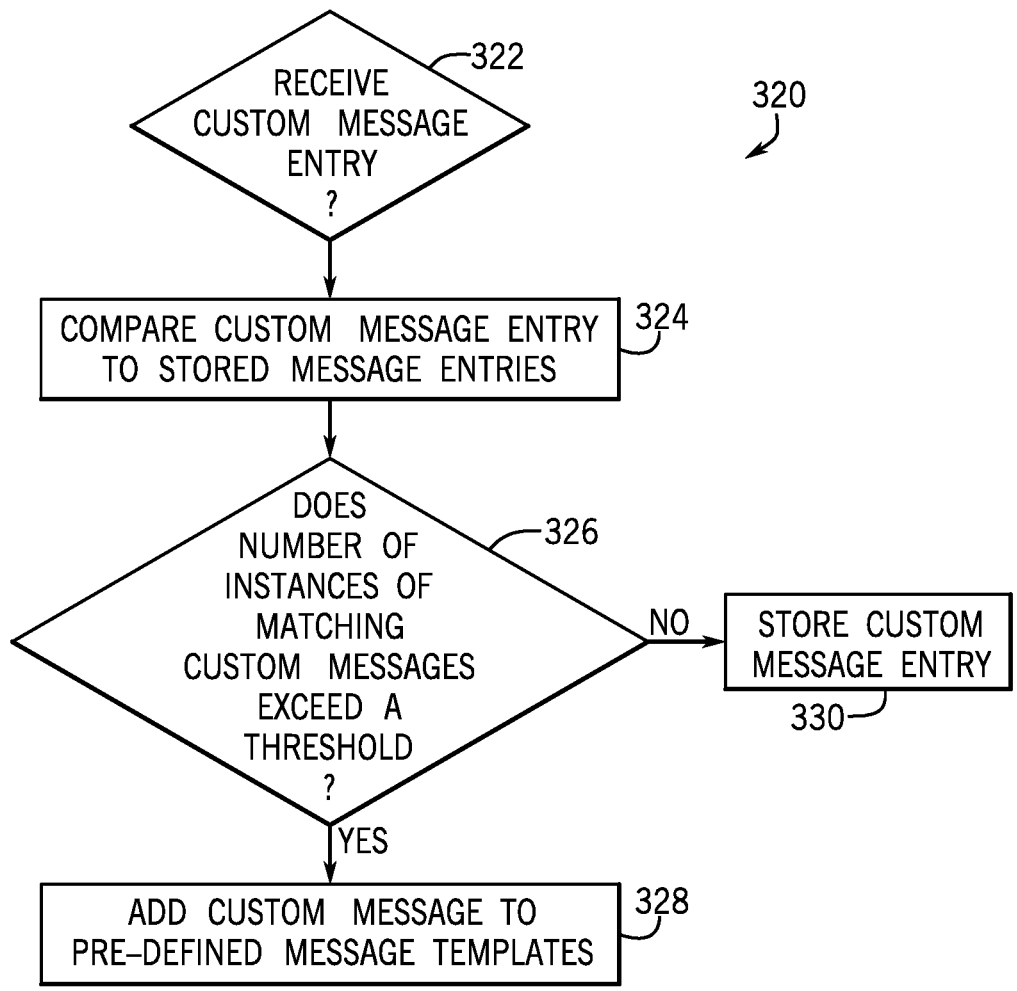
FIG. 9 is an example flow chart of a method for identifying pre-defined templates based on data received by the example server system of FIG. 3, in accordance with an embodiment.

In another embodiment, FIG. 9 illustrates an example method 320 for determining pre-defined message templates for different activities. Referring to FIG. 9, at block 322, the server system 250 may receive a custom message entry, as described above with respect to block 276. The custom message entry may include message text input entirely by a user or a selected pre-defined message template that has been modified by a user.

At block 324, the server system 250 may compare the custom message entry to other stored message entries in the database 108 or the like. In certain embodiments, each time a custom message entry is used by the server system 250, the server system 250 may store a record of the custom message entry with details with regard to the particular activity that the message was used for, information provided in various data field entries, and the like.

At block 326, the server system 250 may determine whether the custom message entry received at block 322 occurs more than a threshold amount of times. That is, the server system 250 may determine whether the number of instances in which the custom message text is identified in the database 108 or the like exceeds a certain threshold number of instances. In some embodiments, the threshold may be related to a percentage of users that use a particular custom message text based on data provided in various data entry fields, a type of activity, or the like.

If the number of instances does exceeds the threshold, the server system 250 may proceed to block 328 and add the custom message entry to the pre-defined message templates. Alternatively, if the number of instances do not exceed the threshold, the server system 250 may proceed to block 330 and store the custom message entry in the database 108 or the like. By employing the method 320, the server system 250 may automatically identify messages that may be well suited as pre-defined message templates without receiving user input. As such, the server system 250 further improves the efficiency in which fulfillers may complete activities by automatically updating the pre-defined message templates based on the dynamic use of custom messages.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a processor;
a memory, accessible to the processor, and storing instructions that, when executed by the processor, cause the processor to perform operations comprising:
receiving an indication of an activity assignment for a first user;
generating a user interface visualization representative of the activity assignment, wherein the user interface visualization comprises a plurality of data entry fields and one or more selectable objects configured to cause the processor to perform one or more actions associated with completing an activity associated with the activity assignment;
receiving a request to draft a message regarding the activity to be sent to a second user via the one or more selectable objects;
determining that data is absent from one or more data entry fields of the plurality of data entry fields;
selecting a first message template of a plurality of message templates in response to the data being absent;
generating message text incorporating the first message template of the plurality of message templates for display via an electronic display, wherein the message text is configured to be presented in a dialogue window depicted on the electronic display and wherein the message text comprises an additional request for additional data based on the data being absent; and
displaying the message text in the dialogue window in response to receiving an approval of the message.

2. The system of claim 1, wherein the processor is configured to perform the operations comprising retrieving the plurality of message templates based on the activity.

3. The system of claim 1, wherein the processor is configured to perform the operations comprising retrieving the plurality of message templates based on an identity of the first user.

4. The system of claim 1, wherein the processor is configured to perform the operations comprising:
receiving a modification to the message text to generate an updated message text;
determining a number of instances that the updated message text has been received; and
updating the plurality of message templates to include the updated message text in response to the number of instances exceeding a threshold.

5. The system of claim 1, wherein the processor is configured to perform the operations comprising tracking a number of instances that at least one message template of the plurality of message templates has been selected.

6. The system of claim 1, wherein the processor is configured to perform the operations comprising tracking a number of instances that at least one selectable object of the one or more selectable objects has been selected.

7. A non-transitory, computer readable medium comprising instructions that, when executed by a processor, causes the processor to perform operations comprising:
receiving an indication of an activity assignment for a first user;
generating a user interface visualization representative of the activity assignment, wherein the user interface visualization comprises a plurality of data entry fields and one or more selectable objects configured to cause the processor to perform one or more actions associated with completing an activity associated with the activity assignment;
receiving a request to draft a message regarding the activity to be sent to a second user via the one or more selectable objects;
determining that data is absent from one or more data entry fields of the plurality of data entry fields;
selecting a first message template of a plurality of message templates in response to the data being absent;
generating message text incorporating the first message template of the plurality of message templates for display via an electronic display, wherein the message text is configured to be presented in a dialogue window depicted on the electronic display and wherein the message text comprises an additional request for additional data based on the data being absent; and
displaying the message text in the dialogue window in response to receiving an approval of the message.

8. The non-transitory, computer readable medium of claim 7, the operations comprising retrieving the plurality of message templates based on the activity.

9. The non-transitory, computer readable medium of claim 7, the operations comprising retrieving the plurality of message templates based on an identity of the first user.

10. The non-transitory, computer readable medium of claim 7, the operations comprising:
receiving a modification to the message text to generate an updated message text;
determining a number of instances that the updated message text has been received; and
updating the plurality of message templates to include the updated message text in response to the number of instances exceeding a threshold.

11. The non-transitory, computer readable medium of claim 7, the operations comprising tracking a number of instances that at least one message template of the plurality of message templates has been selected.

12. The non-transitory, computer readable medium of claim 7, the operations comprising tracking a number of instances that at least one selectable object of the one or more selectable objects has been selected.

13. A method, comprising:
receiving, via a processor, an indication of an activity assignment for a first user, wherein the activity assignment comprises a plurality of data entry fields;
generating, via the processor, a user interface visualization representative of the activity assignment, wherein the user interface visualization comprises the plurality of data entry fields and one or more selectable objects configured to cause the processor to perform one or more actions associated with completing an activity associated with the activity assignment;
determining that data is absent from one or more data entry fields of the plurality of data entry fields;
selecting a first message template of a plurality of message templates in response to the data being absent;
generating, via the processor, message text incorporating the first message template of the plurality of message templates for display via an electronic display, wherein the message text is configured to be stored in a dialogue window and wherein the message text comprises an additional request for additional data based on the data being absent; and
displaying, via the processor, the message text in the dialogue window in response to receiving an approval of the message.

14. The method of claim 13, comprising retrieving, via the processor, the plurality of message templates based on the activity.

15. The method of claim 13, comprising retrieving, via the processor, the plurality of message templates based on an identity of the first user.

16. The method of claim 13, comprising:
receiving, via the processor, a modification to the message text to generate an updated message text;
determining, via the processor, a number of instances that the updated message text has been received; and
updating the plurality of message templates to include the updated message text in response to the number of instances exceeding a threshold.

17. The method of claim 13, comprising tracking, via the processor, a number of instances that at least one message template of the plurality of message templates has been selected.

18. The system of claim 1, wherein the processor is configured to perform the operations comprising:
receiving input indicative of custom message text;
comparing the custom message text to a plurality of stored message texts;
determining a number of instances of the custom message text in the plurality of stored message texts; and
generating a custom message template in response to the number of instances exceeding a threshold.

19. The non-transitory, computer readable medium of claim 7, the operations comprising:
receiving input indicative of custom message text;
determining a number of users that input the custom message text; and
generating a custom message template incorporating the custom message text in response to the number of users exceeding a threshold number of users.

20. The method of claim 13, comprising:
populating, via the processor, at least one data entry field of the plurality of data entry fields with a portion of activity data, wherein the activity assignment comprises the activity data; and updating the message text to incorporate the portion of the activity data.

\* \* \* \* \*